(12) United States Patent
Kawabe et al.

(10) Patent No.: US 6,519,496 B1
(45) Date of Patent: Feb. 11, 2003

(54) FEEDBACK CONTROLLER, DIGITAL FILTER DEVICE, AND STORAGE DEVICE

(75) Inventors: Takayuki Kawabe, Kawasaki (JP); Ichiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/457,656

(22) Filed: Dec. 9, 1999

(30) Foreign Application Priority Data

Feb. 19, 1999 (JP) .......................................... 11-041617

(51) Int. Cl.[7] .............................................. G05B 13/02
(52) U.S. Cl. ............................. 700/55; 700/73; 700/74; 708/300; 708/320
(58) Field of Search ....................... 700/55–56, 73–74; 369/32.01; 379/88.07; 318/636; 327/556; 708/300, 320

(56) References Cited

U.S. PATENT DOCUMENTS

| | | | | |
|---|---|---|---|---|
| 4,901,297 A | * | 2/1990 | Komatsu et al. | 369/13.37 |
| 5,126,897 A | * | 6/1992 | Ogawa et al. | 360/78.09 |
| 5,245,665 A | * | 9/1993 | Lewis et al. | 381/93 |
| 5,377,096 A | * | 12/1994 | Ono | 700/71 |
| 5,532,926 A | * | 7/1996 | Dunn et al. | 700/73 |
| 5,663,847 A | * | 9/1997 | Abramovitch | 360/77.02 |
| 5,745,581 A | * | 4/1998 | Eatwell et al. | 381/71.11 |
| 5,914,924 A | * | 6/1999 | Takagi et al. | 369/44.35 |
| 5,937,020 A | * | 8/1999 | Hase et al. | 375/376 |
| 6,370,365 B1 | * | 4/2002 | Callaway et al. | 455/130 |
| 6,401,006 B1 | * | 6/2002 | Mizuno et al. | 700/189 |

FOREIGN PATENT DOCUMENTS

| | | | | |
|---|---|---|---|---|
| JP | 02157674 A | * | 6/1990 | G01R/31/26 |
| JP | 2246026 | | 10/1990 | |
| JP | 5109090 | | 4/1993 | |
| JP | 9320070 | | 12/1997 | |
| JP | 10031031 | | 2/1998 | |

OTHER PUBLICATIONS

Waltari et al., "A 10–Bit 220 MS/s CMOS Sample and Hold Circuit", Mar. 1998, IEEE, pp. I253–I256.*

* cited by examiner

Primary Examiner—Thomas Black
Assistant Examiner—Crystal J. Barnes
(74) Attorney, Agent, or Firm—Greer, Burns & Crain, Ltd.

(57) ABSTRACT

An apparatus has an input hold circuit for sequentially holding digital feedback signals sequentially transmitted at a sampling period, and for sequentially outputting the transmitted feedback signals or held feedback signals at a period which is shorter than the sampling period; a notch filter for applying a filtering processing to the feedback signals outputted from the input hold circuit; and an output hold circuit for sequentially outputting the feedback signals subjected to the filtering processing by said notch filter, while thinning the same, at a period which is same as the sampling period.

9 Claims, 18 Drawing Sheets

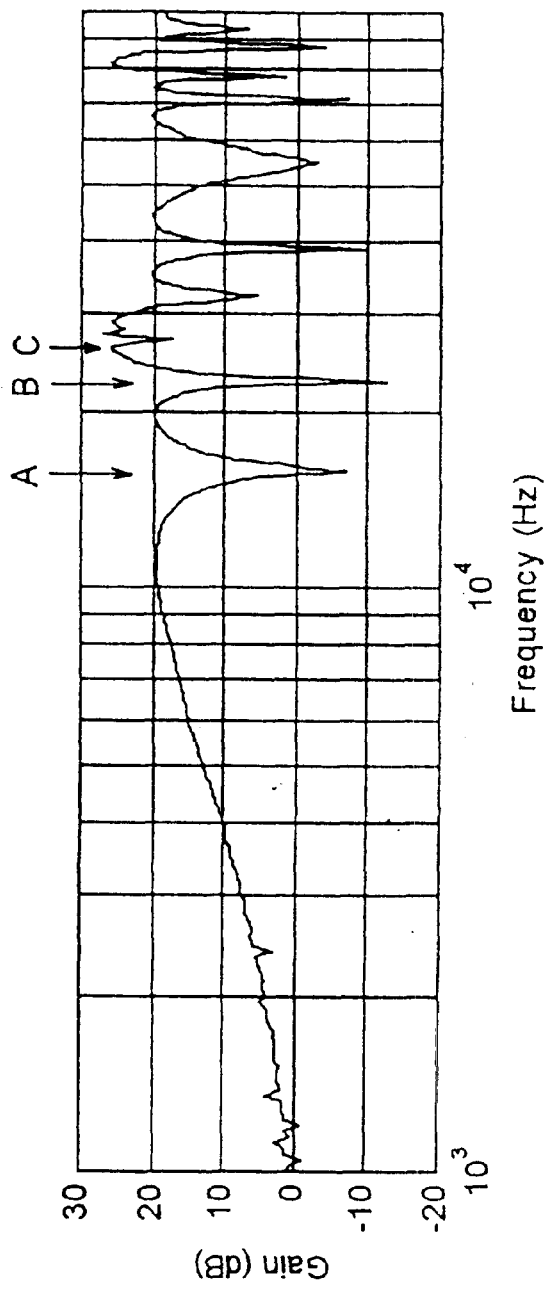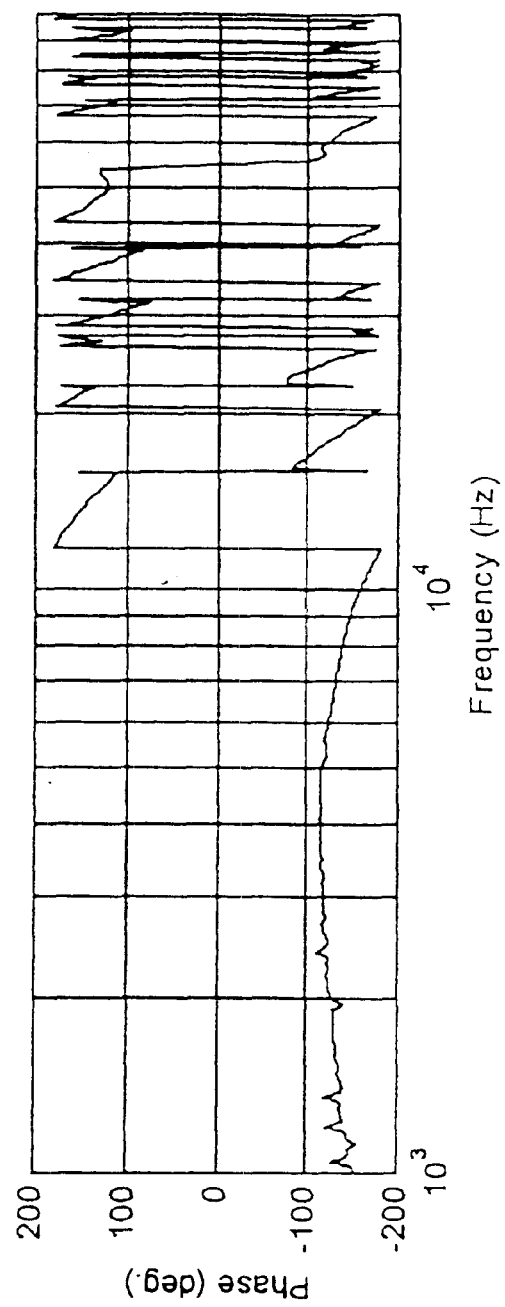
Fig.6(A)
Fig.6(B)

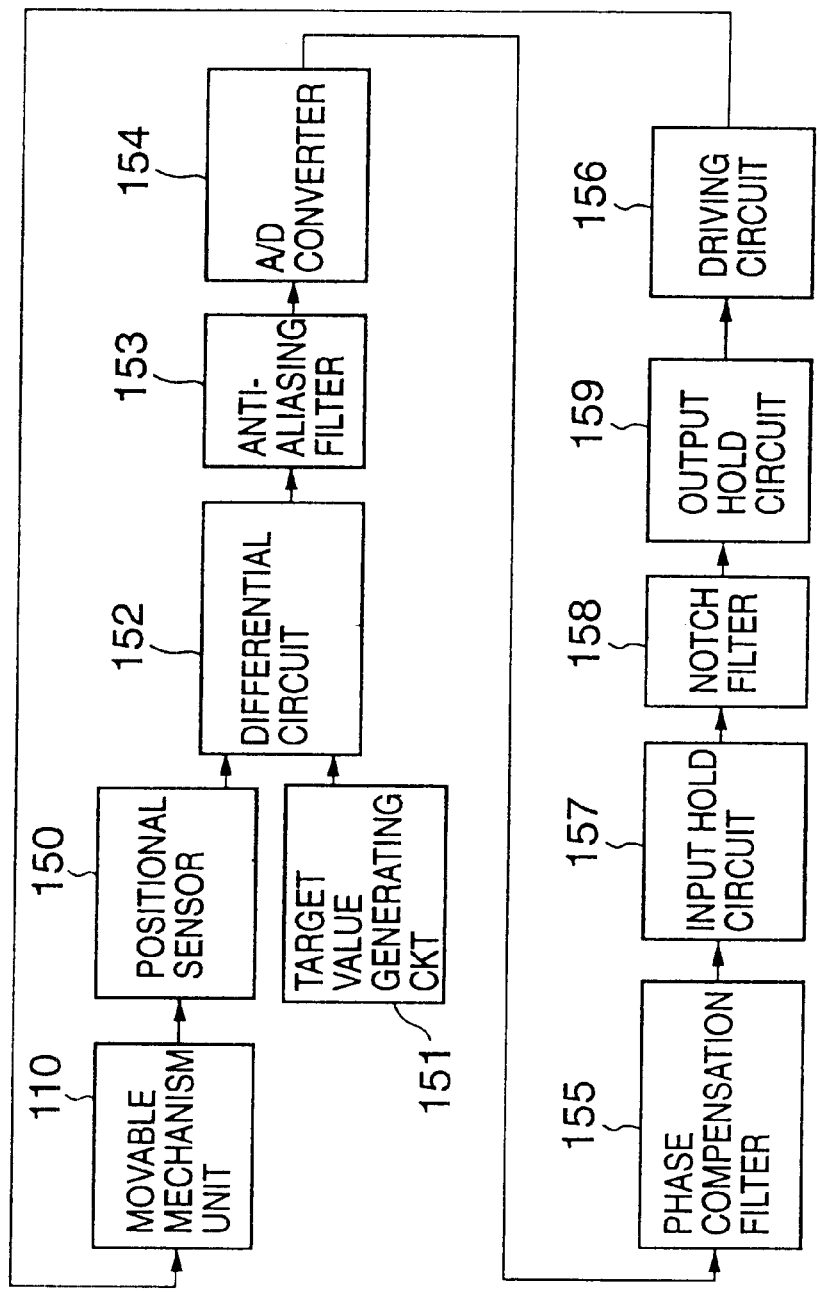

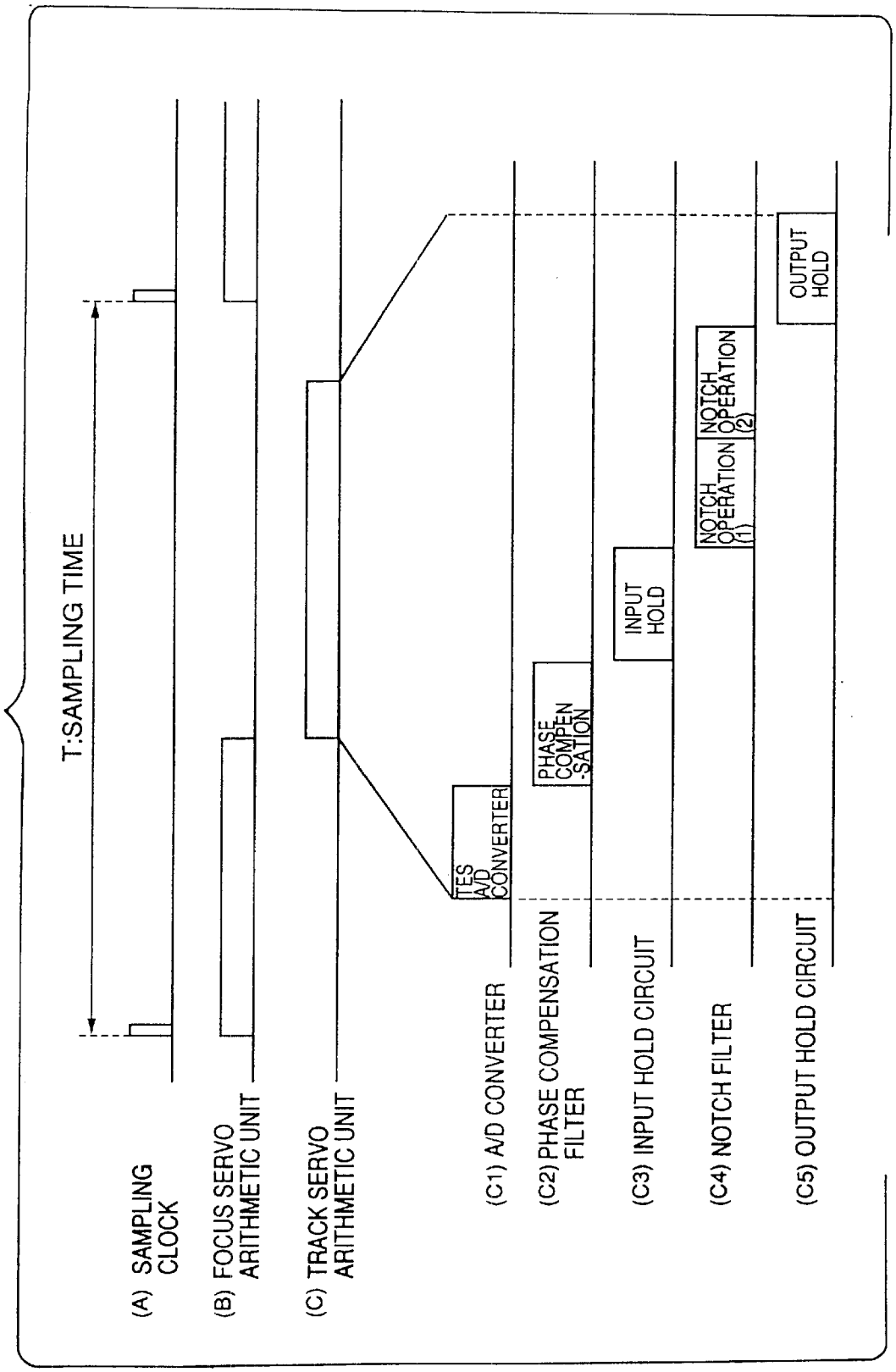

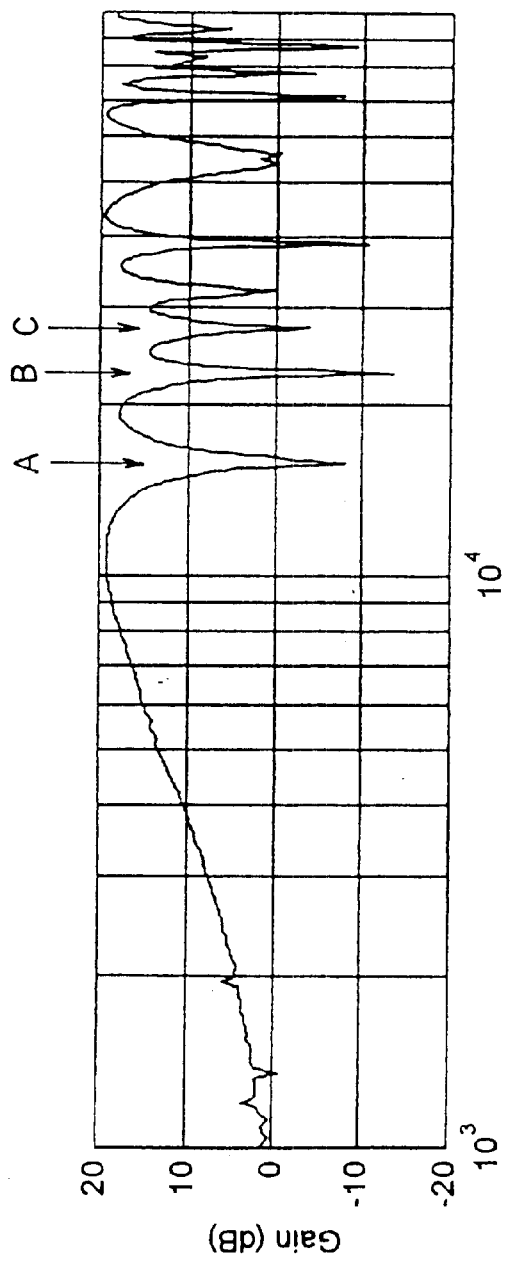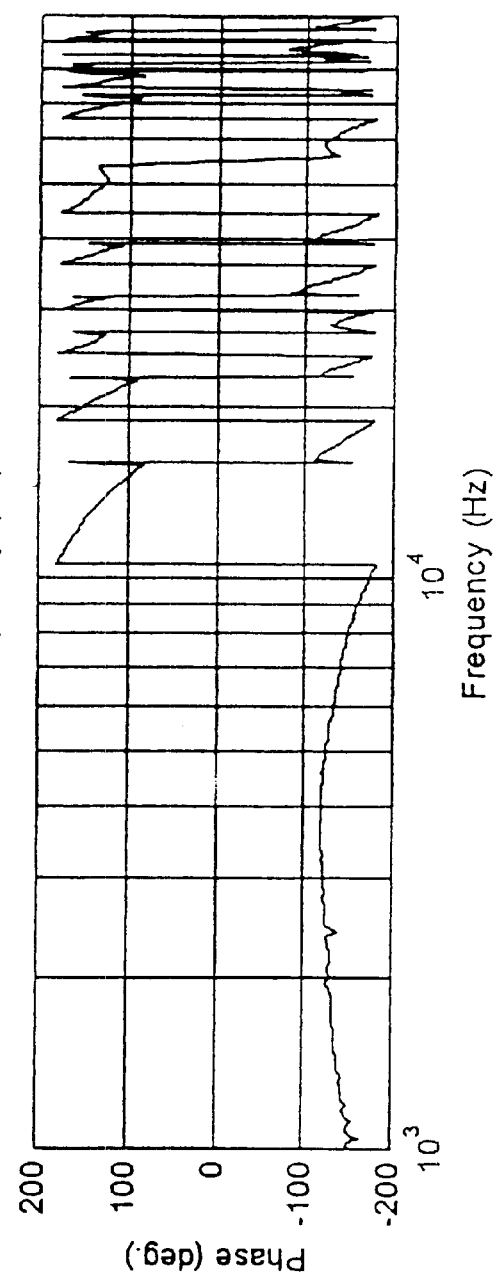
Fig. 16(A)
Fig. 16(B)

FEEDBACK CONTROLLER, DIGITAL FILTER DEVICE, AND STORAGE DEVICE

BACKGROUND OF THE INVENTION

1. Field of the Invention

The present invention relates to a feedback controller for performing a feedback control through detecting a driving state of a driving unit, a digital filter device which is preferably applicable to the feedback controller, and a storage device having a head for at least reproducing information stored in an information storage medium.

2. Description of the Related Art

Hitherto, there is widely used in various fields a feedback controller in which a feedback signal is generated through detecting a driving state of a driving unit, an arithmetic processing such as a phase compensation for a stabilization of a control system is performed, and a driving control of the driving unit is performed in accordance with the feedback signal after the arithmetic processing.

According to the feedback controller as mentioned above, in order to enhance the tracking efficiency, there is adopted such a scheme that a phase-lag compensation is established, a feedback gain is increased to establish a high frequency band.

It is known that when it is intended to increase a gain to a high frequency by the phase-lag compensation, a phase cross frequency is increased, and then the gain margin and the phase margin are decreased, so that a stability of a control system is damaged.

Therefore, there is a need to establish a high frequency band through increasing a gain cross frequency to some extent. However, in the even that in order to increase the gain cross frequency, the feedback gain is increased, there is a need to establish a phase-lead compensation over a high frequency so that a control system is stabilized in the high frequency. In this case, there is a possibility that the stability of the control system is damaged by a high-order resonance of a movable mechanism unit.

In order to solve this problem, there is adopted a scheme that a notch filter or a low pass filter is applied to a high-order resonance frequency. However, in case of a digital filter used in a digital control using a microprocessor unit (MPU), such as a digital signal processor (DSP) and the like which are used for the purpose of establishing low cost and high-performance, the digital filter does not sufficiently operate at a frequency close to the Nyquist frequency which is ½ of the sampling frequency. Therefore, in the event that a high-order resonance frequency of the movable mechanism unit exists at a frequency band close to the Nyquist frequency, it is difficult to ensure a sufficient stability of the control system.

The above-mentioned problem will be described referring to by way of example a feedback controller adopted in an optical storage device for accessing an optical disk. As the optical disk, for example, a phase change optical disk and a magneto optical disk exist. Here, typically, an optical storage device for accessing the magneto optical disk will be considered.

Hereinafter, first, a guide line of the optical storage device will be described, and then problems of the feedback control system will be described.

FIG. 1 is a perspective view of an optical storage device.

A spindle motor 101 for driving an optical disk 200 is fixed on a drive base 100, for example, made of an aluminum. Further, on the drive base 100, there are provided a movable mechanism unit 110 having an objective lens 111 and a magnetic coil 112, and a magnetic circuit 121 having a permanent magnet disposed in such a manner that the movable mechanism unit 110 is sandwiched by the permanent magnet. The magnetic circuit 121 having the permanent magnet and the magnetic coil 112 constitutes a voice coil motor (VCM). As a current is supplied to the magnetic coil 112, the movable mechanism unit 110 moves in a direction of an arrow A–A' by an interaction of the current flowing through the magnetic coil 112 and the magnetic circuit. A laser beam is applied from a fixed optical unit 130 to the objective lens 111. The laser beam is emitted from the objective lens 111 so that an optical spot is projected onto an optical disk 200 and reflected therefrom. The reflected light is returned through the objective lens 111 to the fixed optical unit 130, so that information stored in the optical disk 200 is picked up.

FIG. 2 is a schematic construction view of an optical system of an optical storage device.

A laser beam emitted from a semiconductor laser 131 passes through a collimator lens 132 and a polarization beam splitter 133, and reflects-on a reflecting mirror 113, and further passes through the objective lens 111, and finally be condensed on the optical disk 200.

Here, only the reflecting mirror 113 other than the objective lens 111 is mounted on the movable mechanism unit 110, and other all optical elements constitute the fixed optical unit 130.

A signal light reflected on the optical disk 200, which carries information recorded on the optical disk 200, passes through the objective lens 111, reflects on the reflecting mirror 113, enters the polarization beam splitter 133, and goes to a beam splitter 134 side. An incident light to the beam splitter 134 is divided into two parts one of which enters Wollaston prism 135 whereby the light is separated in accordance with the polarization direction. And the light thus separated enters via a lens 136 a photo detector 137 for picking up information recorded on the optical disk 200.

On the other hand, another of the two parts of light divided by the beam splitter 134 enters via a lens 138 a beam splitter 139 wherein the light is further divided into two parts one of which enters a photo detector 140 for a tracking error detection, and another enters a wedge prism 141 wherein a light beam is further divided into two parts and is projected onto a photo detector 142 for a focus error detection.

FIG. 3 is a block diagram of a feedback controller for driving the movable mechanism unit 110 of the optical storage device.

A position of the movable mechanism unit 110 is detected by a positional sensor 150. The positional sensor 150 comprises the photo detector 140 for tracking an error detection, as shown in FIG. 2, and a signal processing circuit (not illustrated) for processing signals obtained by the photo detector 140. A detection signal obtained by the positional sensor 150 is fed to a differential circuit 152 in which a difference between the detection signal and a target value signal representative of a position of the movable mechanism unit 110, outputted from a target value generating circuit 151, is calculated to generate an error signal. The error signal thus generated is attenuated in high frequency component by an anti-aliasing filter 153 for suppressing a frequency component exceeding Nyquist frequency which is the half of a sampling frequency of an A/D converter 154. The A/D converter 154 converts the error signal thus obtained into a digital signal. A signal outputted from the A/D converter 154 is fed to a phase compensation filter 155 wherein the signal is subjected to a phase compensation processing so as to ensure a stability of a control system through a digital operation. A signal subjected to the phase compensation processing by the phase compensation filter 155 is fed to a driving circuit 156 in the form of a control signal to control the movable mechanism unit 110 to a target position. Incidentally, it is acceptable that the driving circuit 156 receives a digital control signal, or alternatively it is acceptable that the driving circuit 156 receives an analog control signal in such a manner that the output of the phase compensation filter 155 is converted into the analog control signal by a D/A conversion.

The driving circuit 156 supplies a driving signal (here a current signal) to an electromagnetic coil 112 (cf. FIG. 1) of the movable mechanism unit 110 in accordance with the entered control signal, and whereby the movable mechanism unit 110 is controlled to a target position.

FIGS. 4(A) and 4(B) are views showing an example of a frequency characteristic of a displacement of the movable mechanism unit 110 to a current supplied from the driving circuit 156. FIG. 4(A) shows a gain characteristic, and FIG. 4(B) shows a phase characteristic.

Here, the sampling frequency 55 kHz is used. Therefore, the Nyquist frequency is 27.5 kHz which is ½ of the sampling frequency.

The anti-aliasing filter 153 can sufficiently attenuate a high-order of resonance and an electric noise component exceeding 30 kHz. In the event that a cut-off frequency of the anti-aliasing filter 153 is set up to a further low frequency side, it would have an effect on a frequency band related to a control stability in a phase delay. Consequently, it is impossible to set up the cut-off frequency to the lower frequency side than 30 kHz.

At the lower frequency side than 30 kHz, as shown in FIG. 4(A), there exists three high-order of resonance of frequencies A, B and C, where A is about 16 kHz, B is about 22 kHz, and C is about 27.5 kHz which is substantially the same as the Nyquist frequency.

These high-order of resonance of frequencies cause the control system to be insecure.

FIGS. 5(A) and 5(B) are views showing frequency characteristics wherein two notch filters of 16 kHz and 22 kHz and a phase-lead compensation are disposed in a feedback system.

An effect of the differentiation appears up to the vicinity of the Nyquist frequency to ensure a phase margin at the gain close frequency (a frequency at the point where a gain curve crosses 0 dB), and the gain rises. This filter characteristic shows a driving sensitivity to the input error signal, and as seen from FIG. 5(A), the driving sensitivity offers the highest value to an input of the Nyquist frequency (about 27.5 kHz).

FIGS. 6(A) and 6(B) are views showing frequency characteristics wherein two notch filters of 16 kHz and 22 kHz and a phase-lead compensation are disposed in a feedback system, in a similar fashion to that of FIGS. 5(A) and 5(B), and in addition a notch filter of 27.5 kHz is disposed in the feedback system.

As will be understood from FIGS. 6(A) and 6(B), the notch filter almost has no effect at the frequency band (high-order of resonance C) near the Nyquist frequency.

FIG. 7 is a view showing a signal wave form of an error signal outputted from the differential circuit 152 when the noise of 27.5 kHz is added to the feedback control system, and a driving signal outputted from the driving circuit 156. FIG. 8 is a view showing a signal wave form in which a part of the signals shown in FIG. 7 is enlarged on a time basis.

As shown in FIGS. 7 and 8, it will be understood that both the error signal and the driving signal vibrate at 27.5 kHz. FIGS. 7 and 8 show a result when the noise of 27.5 kHz is added intentionally to the feedback control system for the purpose of a confirmation of the stability of the control system. However, it is poor in the stability of the control system, and in the event that the movable mechanism unit 110 is considered in connection with an unevenness on production, there is a high possibility that a defective unit in which the movable mechanism unit 110 is excited unstably appears.

In the event that a high-order resonance frequency of the movable mechanism unit exists at the frequency band near the Nyquist frequency, as mentioned above, in order to ensure a sufficient stability of the control system, hitherto, there is a need to increase the sampling frequency, or alternatively to change a design of the movable mechanism unit so as to increase the high-order resonance frequency.

However, in order to increase the sampling frequency, there is a need that the A/D converter and other digital signal processing system are operated at high speed. In many cases, it is not permitted in view of the cost of manufacturing. On the other hand, there is a limit in a point that the high-order resonance frequency of the movable mechanism unit is increased, and also with respect to the change of the design, in many cases, it is difficult through a change of the design to expect that the high-order resonance frequency of the movable mechanism unit is increased to a sufficiently high frequency. Further, in some case, it is difficult to change the design per se.

FIGS. 9(A)–(C) are explanatory views useful for understanding another problem involved in the vibration of the driving signal.

FIG. 9(A) shows a signal waveform of a driving signal which is essentially necessary. FIG. 9(B) shows a signal waveform of a signal in which a high frequency noise is superposed on the essentially necessary driving signal. FIG. 9(C) shows a signal waveform of a signal in which a further large high frequency noise is superposed on the essentially necessary driving signal and thereby reaching a saturation level.

As the high frequency noise is superposed on the driving signal, even if the high-order resonance of the movable mechanism unit does not exist on the frequency, the saturation of the high frequency noise brings about disappearance or attenuation of the essentially necessary driving signal as shown in FIG. 9(C). Thus, there is a possibility that a normal feedback control is not performed.

SUMMARY OF THE INVENTION

In view of the foregoing, it is an object of the present invention to provide a feedback controller capable of ensuring a sufficient stability, a digital filter which is preferably applicable to the feedback controller, and a storage device having a head for at least reproducing information stored in an information storage medium, and being capable of driving the head stably and with a sufficient tracking performance.

To achieve the above-mentioned objects, the present invention provides a feedback controller wherein a driving state of a driving unit is detected to generate feedback signals so that a driving control for the driving unit is performed, said feedback controller comprising:

a sampling unit for sampling on a digital basis the feedback signals at a predetermined first period;

a filter input unit for sequentially holding the feedback signals sequentially transmitted from said sampling unit at the first period, and for sequentially outputting the transmitted feedback signals or held feedback signals at a second period which is shorter than the first period;

a digital filter for applying a filtering processing to the feedback signals outputted from said filter input unit; and a filter output unit for sequentially outputting the feedback signals subjected to the filtering processing by said digital filter, while thinning the same, at the first period.

In the above-mentioned feedback controller, it is acceptable that the feedback signals, which are generated upon detection of a driving state of the driving unit, are signals per se derived through a sensor for detecting the driving state, or alternatively it is acceptable that the feedback signals are signals processed involved in the signals derived from the sensor, for example, error signals representative of differences between the signals derived from the sensor and a target positional signal.

According to the present invention, the filter input unit generates the feedback signals at the second period which is shorter than the first period (a sampling period), and the digital filter applies a filtering processing to the feedback signals at the second period. This feature makes it possible to expect a sufficient filtering effect as to a frequency near for example a Nyquist frequency. Further, according to the present invention, the filter output unit restores the signals outputted from the digital filter to signals of the original first period. Thus, it is sufficient that only the portion of the digital filter is subjected to a high frequency arithmetic operation. Therefore, as compared with a case where a sampling frequency in the sampling unit is increased per se, there is no need to increase an operating speed for a digital arithmetic operation processing for the sampling unit and other than the portion of the digital filter. Thus it is possible to greatly suppress a manufacturing cost.

In the feedback controller according to the present invention as mentioned above, it is preferable that said filter input unit sequentially outputs the transmitted feedback signals or the held feedback signals at the second period which is 1/N (where N=integer) of the first period.

Adoption of the period which is 1/N (where N=integer) of the first period makes it possible to simplify an arrangement of the filter input unit and the filter output unit.

In the feedback controller according to the present invention as mentioned above, it is acceptable that said digital filter is a notch filter for eliminating or attenuating a specific frequency component, for example, a frequency component which is the same as a Nyquist frequency.

In the feedback controller according to the present invention as mentioned above, while the feedback controller according to the present invention is not restricted in a use, it is preferable that the feedback controller controls a detection head for picking up information stored in an information recording medium in such a manner that the detection head comes close to the information recording medium and moves, and more particularly the feedback controller controls a movement of the detection head.

Here, it is acceptable that the information recording medium is an optical disk or alternatively a magnetic disk. And thus, it is acceptable that the detection head is the optical head as show in FIGS. 1 and 2, or alternatively a magnetic head for electro-magnetically picking up information.

Further, according to the present invention, there is provided a digital filter device comprising:

a filter input unit for sequentially holding digital signals, which are sequentially transmitted at a predetermined first period, at the first period, and for sequentially outputting the transmitted digital signals or held digital signals at a second period which is shorter than the first period;

a digital filter for applying a filtering processing to the digital signals outputted from said filter input unit; and a filter output unit for sequentially outputting the digital signals subjected to the filtering processing by said digital filter, while thinning the same, at the first period.

According to the digital filter of the present invention as mentioned above, it is possible to have an effective filtering function on the frequency near the Nyquist frequency.

Furthermore, according to the present invention, there is provided a storage device having a head for at least reproducing information stored in an information storage medium, said storage device comprising:

a driving unit for moving and controlling said head;

a feedback signal generating unit for detecting a position of said head and generating feedback signals to be fed to said driving unit on a feedback basis;

a sampling unit for sampling on a digital basis the feedback signals at a predetermined first period;

a filter input unit for sequentially holding the feedback signals sequentially transmitted from said sampling unit at the first period, and for sequentially outputting the transmitted feedback signals or held feedback signals at a second period which is shorter than the first period;

a digital filter for applying a filtering processing to the feedback signals outputted from said filter input unit; and a filter output unit for sequentially outputting the feedback signals subjected to the filtering processing by said digital filter, while thinning the same, at the first period.

In the storage device according to the present invention as mentioned above, it is acceptable that said driving unit is a track driving unit for moving said head in a track direction, or alternatively it is acceptable that said driving unit is a focus driving unit for moving said head in a focus direction.

As seen in the storage device having a head for reproducing information stored in, for example, an optical disk, the driving in the track direction is to perform a double servo by both the carriage and the track actuator. In some cases, there is provided a single servo in which only a carriage has a driving unit. The storage device according to the present invention is applicable to both the single servo and the double servo. And further, in case of the double servo, the storage device according to the present invention is applicable to either one or both of the carriage and the track actuator.

According to the storage device of the present invention, it is possible to improve the follow-up performance of the head. That is, an application of the storage device to a track driving unit for moving a head in a track direction makes it possible to improve a track follow-up performance of the head, since the head moves promptly, and thus a control band is expanded. Further, an application of the storage device to a focus driving unit for moving the head in a focus direction makes it possible to improve the follow-up performance of the head in the focus direction, and whereby the head promptly responds to being out of focus.

BRIEF DESCRIPTION OF THE DRAWINGS

FIGS. 6(A) and 6(B) are views showing frequency characteristics wherein two notch filters of 16 kHz and 22 kHz and a phase-lead compensation are disposed in a feedback system, in a similar fashion to that of FIGS. 5(A) and 4(B), and in addition a notch filter of 27.5 kHz is disposed in the feedback system.

FIG. 11 is a block diagram of a feedback controller for driving a movable mechanism unit of an optical storage device according to the present invention.

FIG. 12 is a time chart useful for understanding a control at the time of detection of information of an optical storage device.

FIGS. 16(A) and 16(B) are views showing frequency characteristics wherein two notch filters of 16 kHz and 22 kHz and a phase-lead compensation are disposed in a feedback system of a track servo, in a similar fashion to that of FIGS. 5(A) and 5(B) and FIGS. 6(A) and 6(B), and in addition a notch filter of 27.5 kHz having an structure shown in FIG. 11 is disposed in the feedback system.

DETAILED DESCRIPTION OF PREFERRED EMBODIMENTS

Hereinafter, there will be described embodiments of the present invention. Here, there will be described an optical storage device by way of example.

Figure 10:
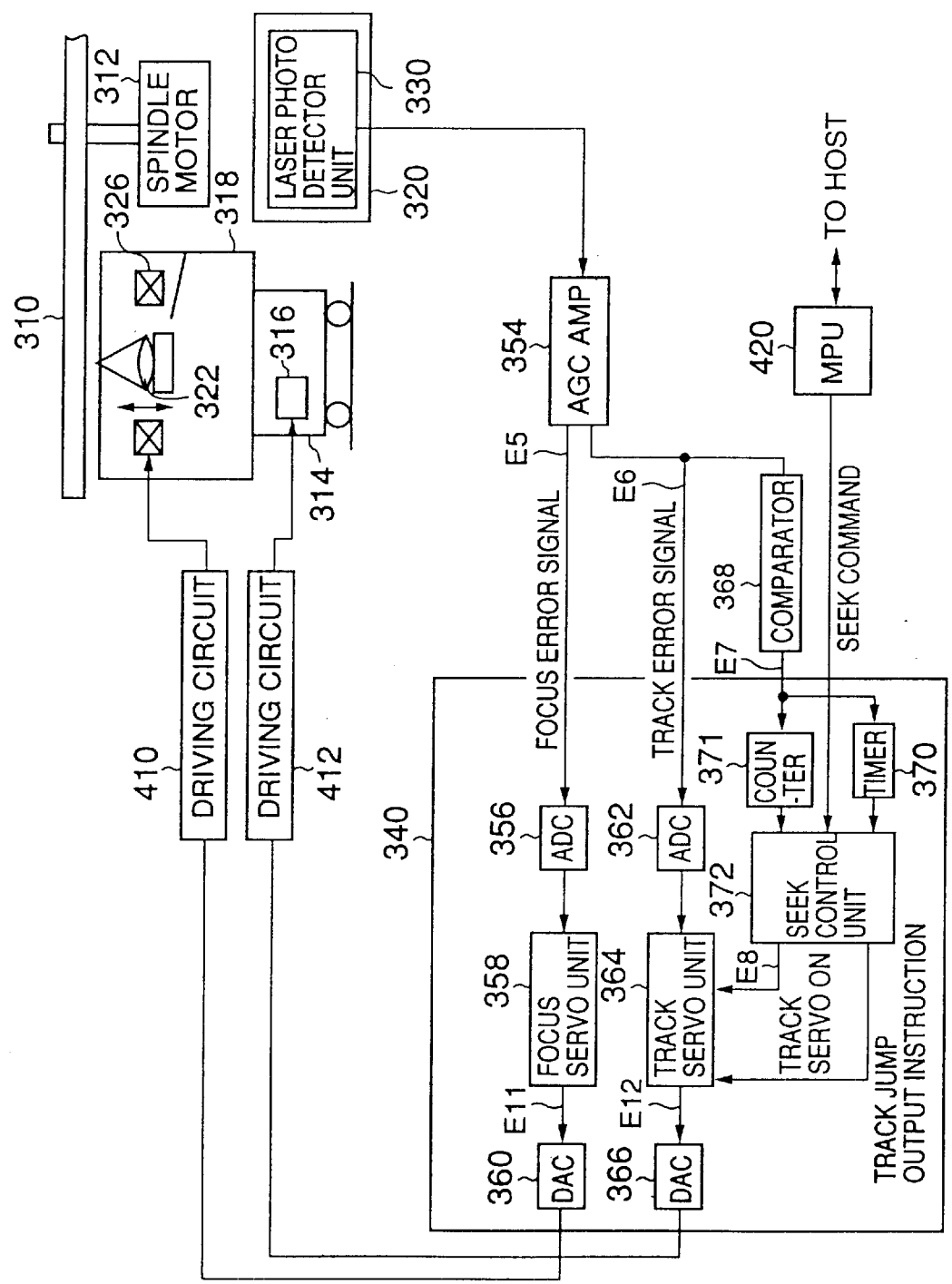
FIG. 10 is a block diagram of an optical storage device to which the present invention is applied.

FIG. 10 is a is a block diagram of an optical storage device to which the present invention is applied. In FIG. 10, an optical disk 310 is a medium which is optically readable and writable and is accommodated in a cartridge (not illustrated). As the cartridge of the optical disk 310 is loaded onto the device, a spindle motor 312 rotates the optical disk 310 at a constant speed.

Figure 1:
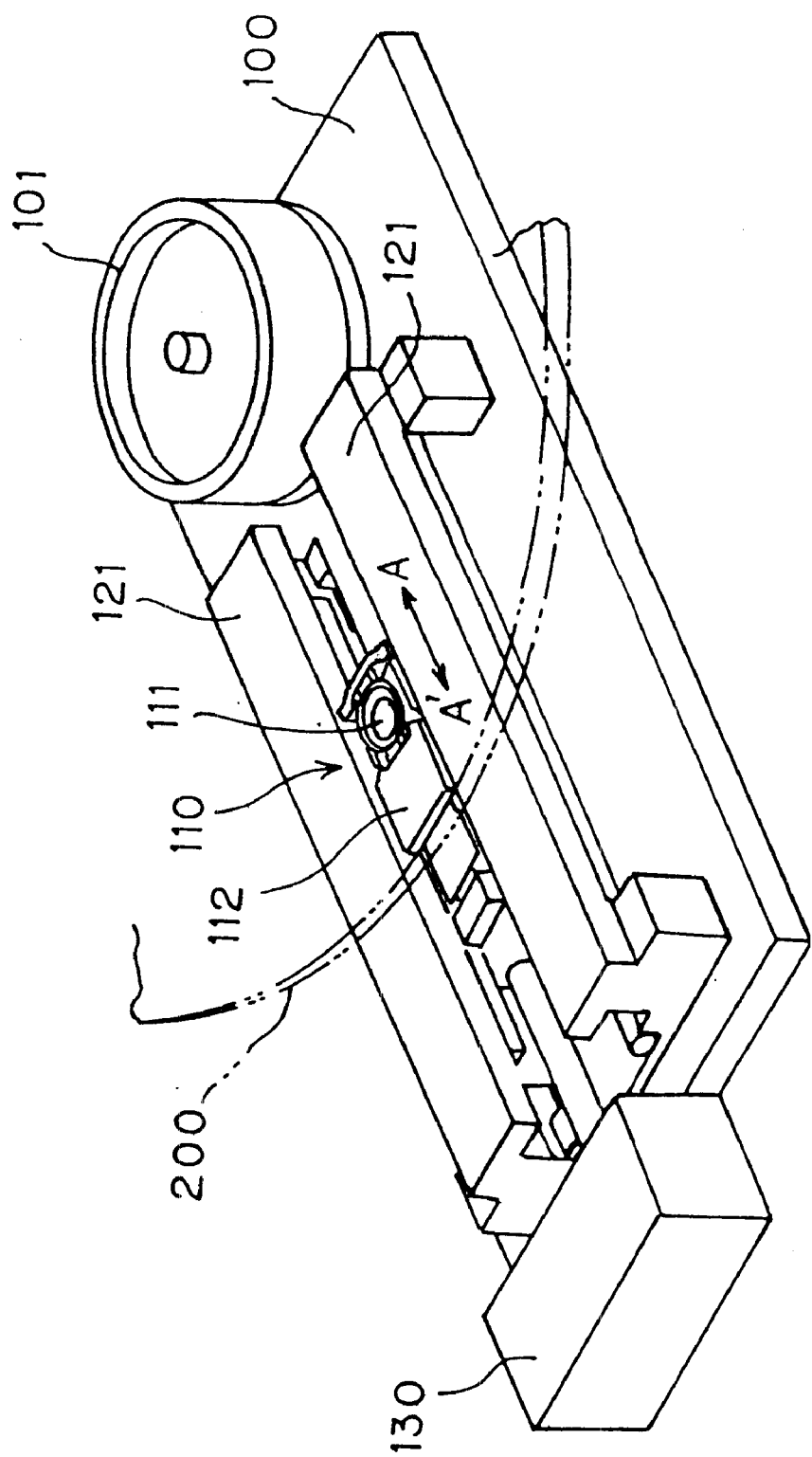
FIG. 1 is a perspective view of an optical storage device.

Against the optical disk 310, a carriage 314 is disposed in such a manner that it is movable in a radius direction of the optical disk 310. The carriage 314 is loaded with an optical head movable section 318. The carriage 314 is moved by a carriage driving coil in the radius direction of the optical disk 310. Specifically, the voice coil motor 316, which is referred to in FIG. 1, is used to move the carriage 314.

The optical head movable section 318, which is loaded onto the carriage 314, is provided with an objective lens 322. The objective lens 322 condenses laser beams emitted from an optical head fixed section 320 on a medium surface of the optical disk 310 so as to form a beam spot. Further, the objective lens 322 is moved by a focus actuator driving coil 326 in an optical axis direction, so that a focal point control is performed to form a prescribed beam spot on the medium surface of the optical disk 310.

Figure 2:
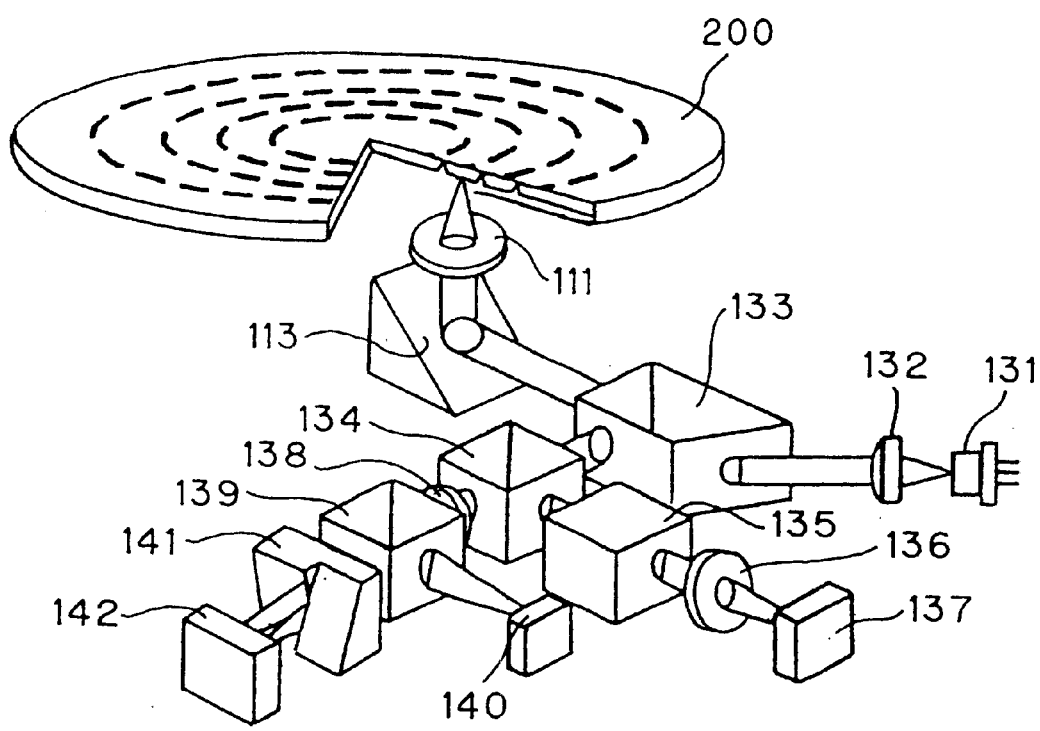
FIG. 2 is a schematic construction view of an optical system of an optical storage device.

On the optical head fixed section 320, there is provided a laser photo detector 330 for detecting returned light of the beam spot imaged on the optical disk 310 by the objective lens 322. A received optical signal of the laser photo detector 330 is fed to an AGC amplifier 354. The AGC amplifier 354 outputs a focus error signal E5 and a track error signal E6. Of course, the optical head fixed section 320 is provided with a laser light source for emitting a laser beam to the optical head movable section 318. The detail of the optical head fixed section 320 is the same as FIG. 2.

A DSP 340 is provided to control a servo mechanism of the carriage 314 and the focus actuator driving coil 326.

The DSP 340 includes AD converters (ADC) and DA converters (DAC). As the DSP 340, for example, Fujitu product MB86312 can be used. The DSP 340 further comprises a focus servo unit 358 which serves as a focus servo arithmetic unit, a track servo unit 364 which serves as a track servo arithmetic unit, and a seek control unit 372 which serves as a seek arithmetic unit.

Thus, the focus error signal E5 and the track error signal E6 outputted from the AGC amplifier 354 are fed via AD converters 356 and 362 to the focus servo unit 358 and the track servo unit 364, respectively. Current indication data E11 and E12 outputted from the focus servo unit 358 and the track servo unit 364 are fed on a feedback basis via DA converters 360 and 366 to driving circuits 410 and 412, respectively, so that a focal point control for a beam spot and an on-track control are performed.

The seek control unit 372 performs a control for a position determination of the carriage 314 to a target track position in accordance with a seek command from a microprocessor unit (MPU) 420, for example, Fujitsu product MB86312. The track error signal E6 outputted from the AGC amplifier 354 is fed to a comparator 368 to detect a TES zero cross signal E7.

The TES zero cross signal E7 is counted by a counter 371 during a predetermined period of time measured by a timer 370, and is compared with a target velocity by the seek control unit 372. The track servo unit 364 outputs a current indication data E12 to the DA converter 366 so that the deviation becomes zero, and performs a feedback control for the driving circuit 412.

To perform a seek control, the seek control unit 372 generates a track jump output instruction and simultaneously inhibits a generation of a track servo on signal E8, so that the on-track control by the track servo unit 364 is released. Thus, an inhibition of a generation of a track servo on signal E8 releases the on-track control and performs a seek operation in accordance with the track jump output instruction.

In this manner, the optical storage device is provided with three feedback controls in the focus servo, the track servo and the seek control.

FIG. 11 is a block diagram of a feedback controller for driving a movable mechanism unit of an optical storage device according to the present invention. In FIG. 11, the same parts are denoted by the same reference numbers as those of FIG. 3, and a redundant description will be omitted.

Figure 3:
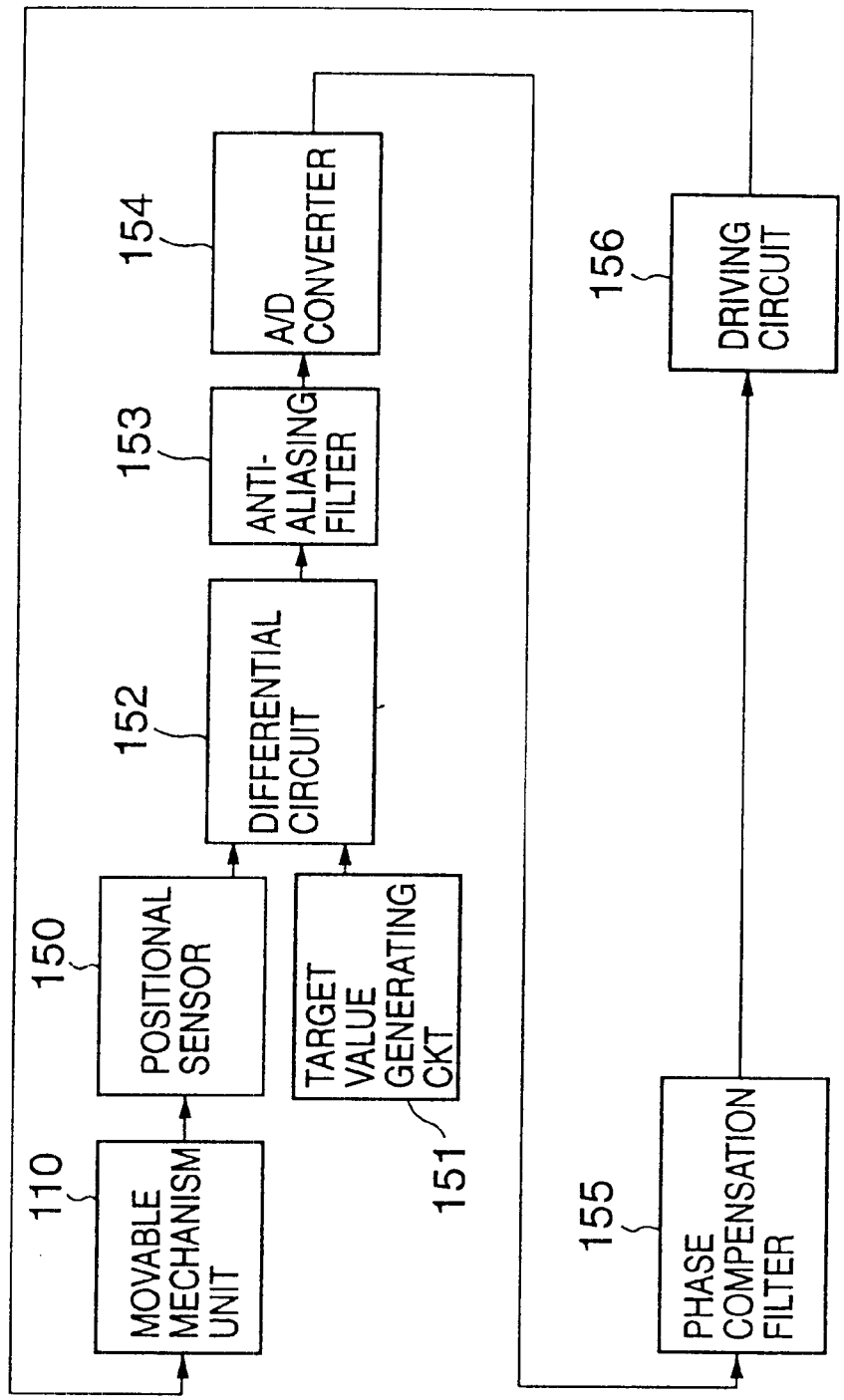
FIG. 3 is a block diagram of a feedback controller for driving the movable mechanism unit of the optical storage device.
Figure 4A:
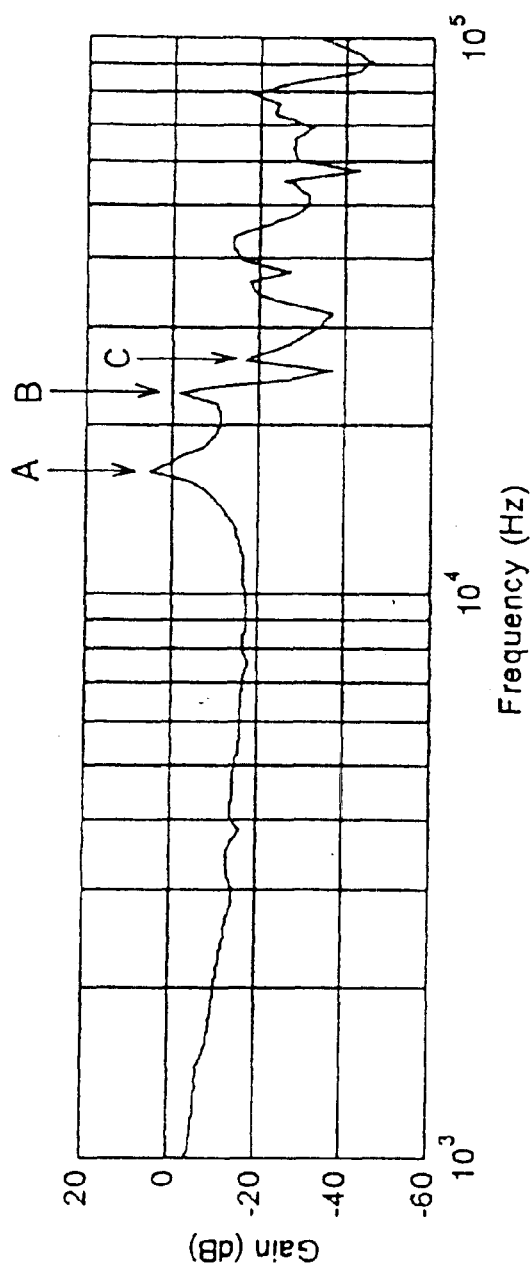
FIGS. 4(A) and 4(B) are views showing an example of a frequency characteristic of a displacement of the movable mechanism unit 110 to a current supplied from the driving circuit 156.
Figure 4B:
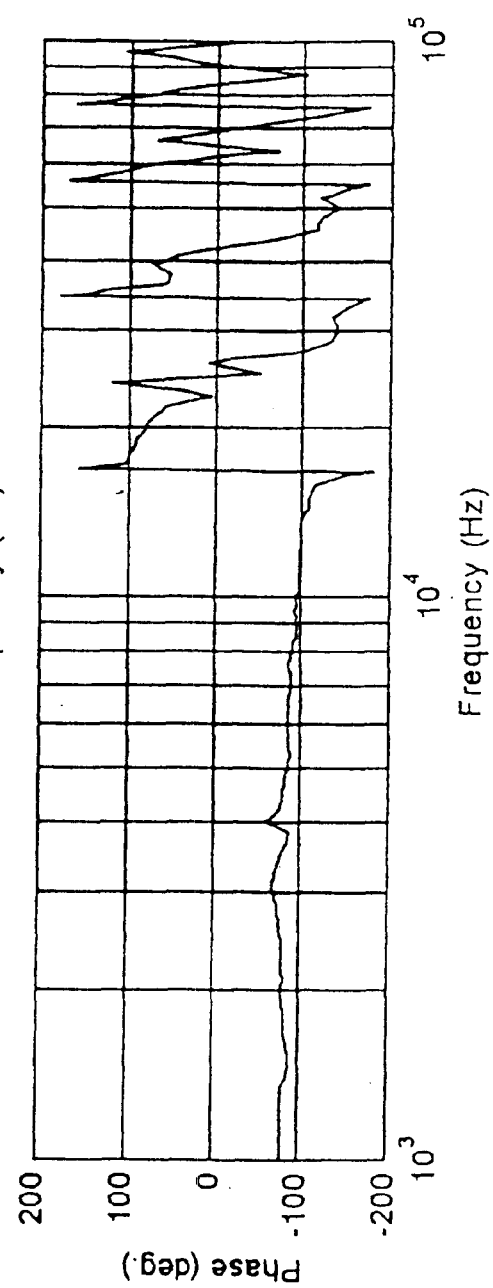
Figure 5A:
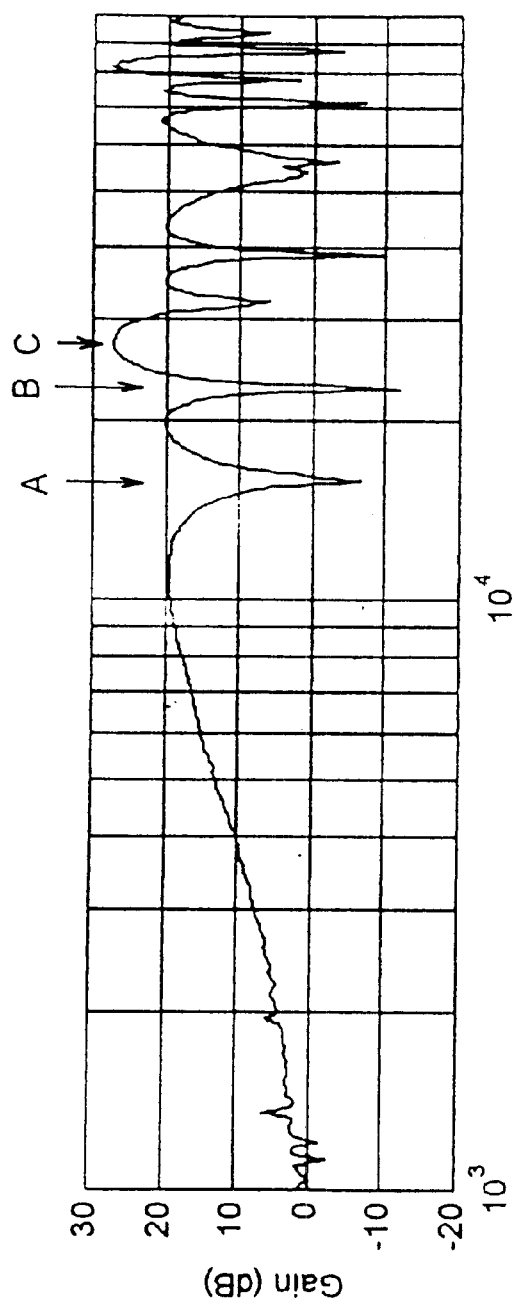
FIGS. 5(A) and 5(B) are views showing frequency characteristics wherein two notch filters of 16 kHz and 22 kHz and a phase-lead compensation are disposed in a feedback system.
Figure 5B:
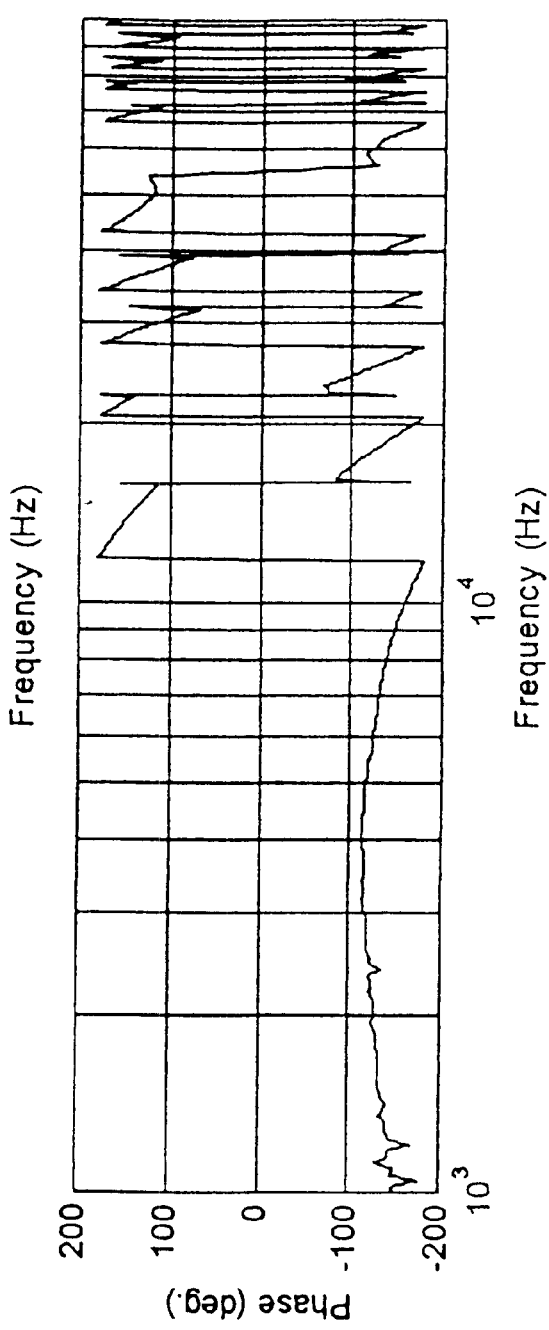

In the feedback controller shown in FIG. 11, between the phase compensation filter 155 and the driving circuit 156, which are also shown in FIG. 3, there are disposed an input hold circuit 157, a notch filter 158 and an output hold circuit 159. The input hold circuit 157, the notch filter 158 and the output hold circuit 159 correspond to examples of the filter input unit, the digital filters and the filter output unit, respectively, referred to in the present invention. These three elements constitute a digital filter according to the embodiment of the present invention. Operation of these three elements will be described later.

The present invention is to perform a feedback control and is applicable to ones involved in the above-mentioned problems. Consequently, the present invention is applicable to three feedback controls in the focus servo, the track servo and the seek control in the optical storage device as shown in FIG. 10.

Particularly, in the event that the present invention is applied to the focus servo and the track servo, the movable mechanism unit 110 serves as the carriage and the focus actuator. The positional sensor 150, the target value generating circuit 151, and the differential circuit 152 correspond to an error signal generating circuit (omitted in FIG. 10) for generating the track error signal and the focus error signal.

The track error signal and the focus error signal amplified by the AGC amplifier 354 are applied to the anti-aliasing filter and then applied to the AD converters 362 and 356 of the DSP340, respectively.

In the focus servo unit 358 and the track servo unit 364, the associated signals pass through the phase compensation filter 155, the input hold circuit 157, the notch filter 158 and the output hold circuit 159, as shown in FIG. 11, and then be applied through a D/A converter (not illustrated) to the driving circuit 156 on a feedback basis.

FIG. 12 is a time chart useful for understanding a control at the time of detection of information of an optical storage device.

During a sampling time T which is a time interval between the adjacent sampling clocks (part (A) of FIG. 12), a focus servo arithmetic unit (part (B) of FIG. 12) is operate, and then a track servo arithmetic unit (part (C) of FIG. 12) is operated.

The focus servo arithmetic unit performs a focusing in such a manner that the objective lens 111 (cf.

FIG. 1) is translated in a direction wherein the objective lens 111 approaches the optical disk 200 or goes away from the optical disk 200, on the basis of a detection signal of the photo detector 142 (cf. FIG. 2) for a focus error detection. This is not related to the present invention on a direct basis, and thus the detailed description will be omitted.

The track servo arithmetic unit corresponds to the portion of the A/D converter 154 to the output hold circuit 159 of the feedback controller shown in FIG. 11.

Here, first, an A/D conversion is performed by the A/D converter 154 (part (C1) of FIG. 12), then a phase compensation arithmetic operation is performed by the phase compensation filter 155 (part (C2) of FIG. 12). Further, an input hold by the input hold circuit 157 (part (C3) of FIG. 12), a notch arithmetic operation by the notch filter 158 (part (C4) of FIG. 12) and an output hold by the output hold circuit 159 (part (C5) of FIG. 12) are performed in the named order. The notch arithmetic operation by the notch filter 158 is divided into a notch arithmetic operation (1) and a notch arithmetic operation (2).

Hereinafter, the input hold, the notch arithmetic operation (1), the notch arithmetic operation (2), and the output hold are explained in the named order.

Figure 13A:
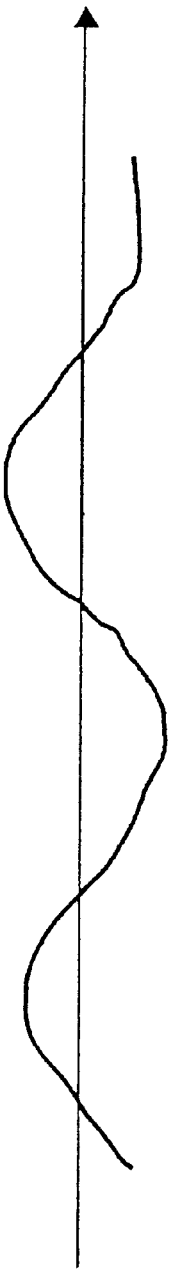
FIGS. 13(A) and 13(B) are explanatory views useful for understanding an operation of an input hold circuit.
Figure 13B:
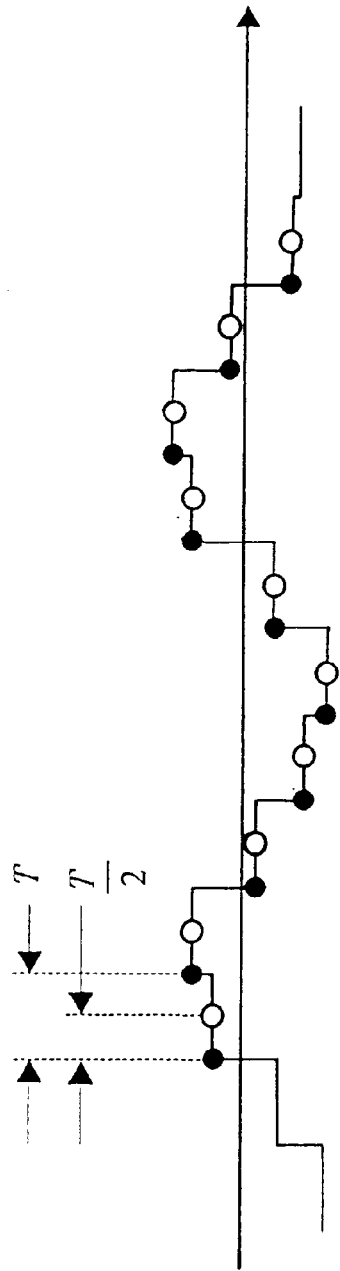

FIGS. 13(A) and 13(B) are explanatory views useful for understanding an operation of the input hold circuit 157. Here, for the purpose of simplification, the phase compensation filter 155 is out of the consideration.

It is assumed that digital signals denoted by the black dots shown in FIG. 13(B) are obtained in such a manner that an analog signal shown in FIG. 13(A), which is a signal before the conversion by the A/D converter 154, is subjected to a sampling with a sampling period T by the A/D converter 154 and then converted into a digital signal. The phase compensation filter 155 permits the digital signals denoted by the black dots to pass through as they are and to be fed to the input hold circuit 157. Upon receipt of the digital signals denoted by the black dots, the input hold circuit 157 holds sequentially the digital signals at a period T of receipt of the digital signals, and outputs sequentially the received digital signals or the held digital signals at a period T/2. That is, the input hold circuit 157 sequentially outputs the digital signals represented by the black dots and white dots shown in FIG. 13(B). Further, in other words, the input hold circuit 157 outputs the digital signals which are substantially equivalent to a matter that a sampling period T is changed to T/2.

Figure 14:
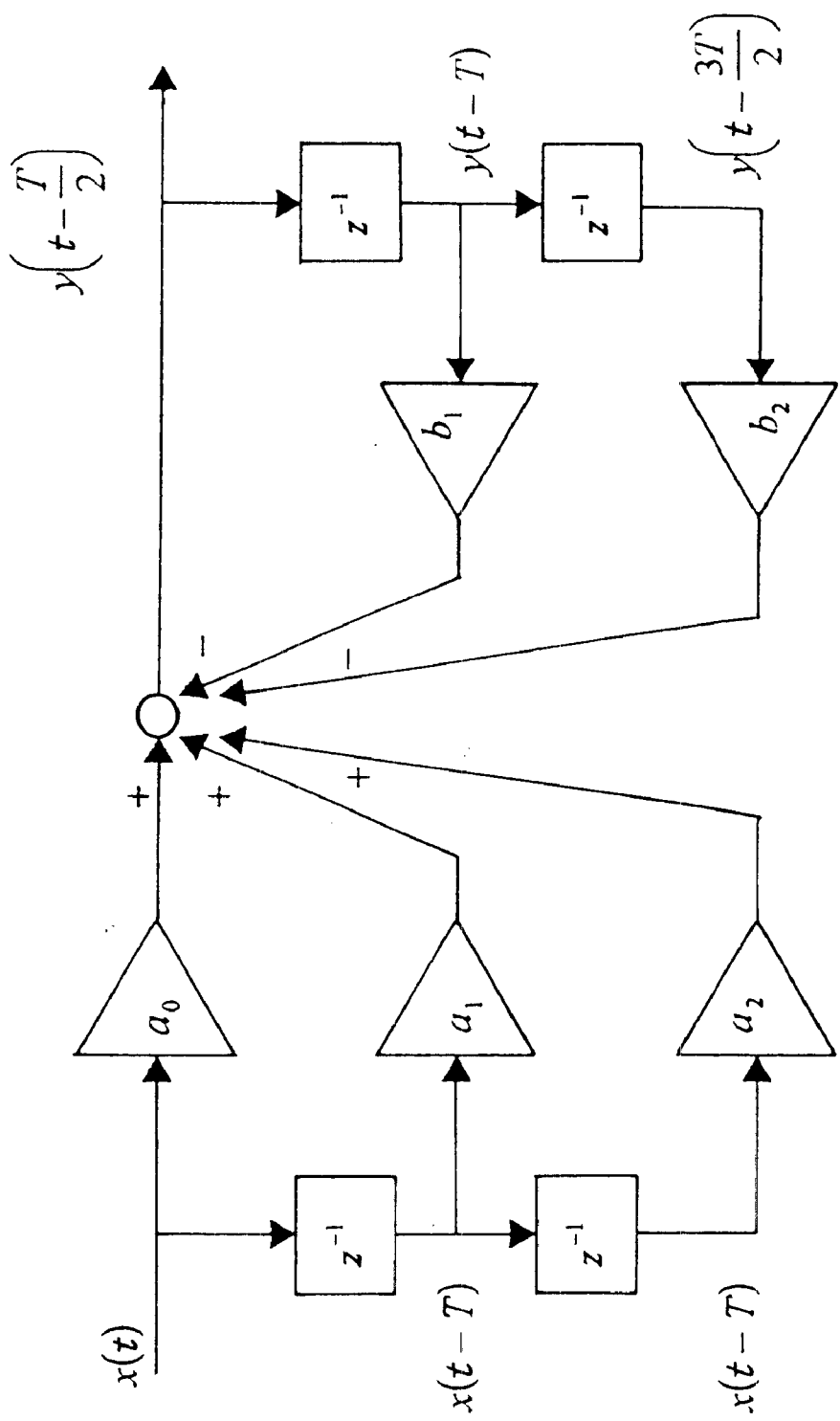
FIG. 14 is a circuit block diagram of a notch filter wherein signals of a notch operation (1) are added.

FIG. 14 is a circuit block diagram of a notch filter wherein signals of the notch operation (1) are added.

Here, x(t) is a new input, and T is a sampling period. Thus, x(t−T) implies a sampling signal before one period with respect to x(t). $z^{-1}$ denotes a delay unit of T/2. $a_0$, $a_1$, $a_2$, $b_1$, $b_2$ denote notch filter constants of sampling time T/2 and notch frequency 1/(2T). That is, the notch filter shown in FIG. 14 is arranged to cut a frequency which is the same as the Nyquist frequency.

In timing represented by the signals added in FIG. 14, an output y (t−T/2) is expressed by the following equation.

$$y(t-T/2)=a_0x(t)+a_1x(t-T)+a_2x(t-T)-b_1y(t-T)+b_2y(t-3T/2)$$

It is noted that the output of the notch filter in this timing is not fed to the output hold circuit 159 and thus is not transmitted to the driving circuit 156.

Figure 15:
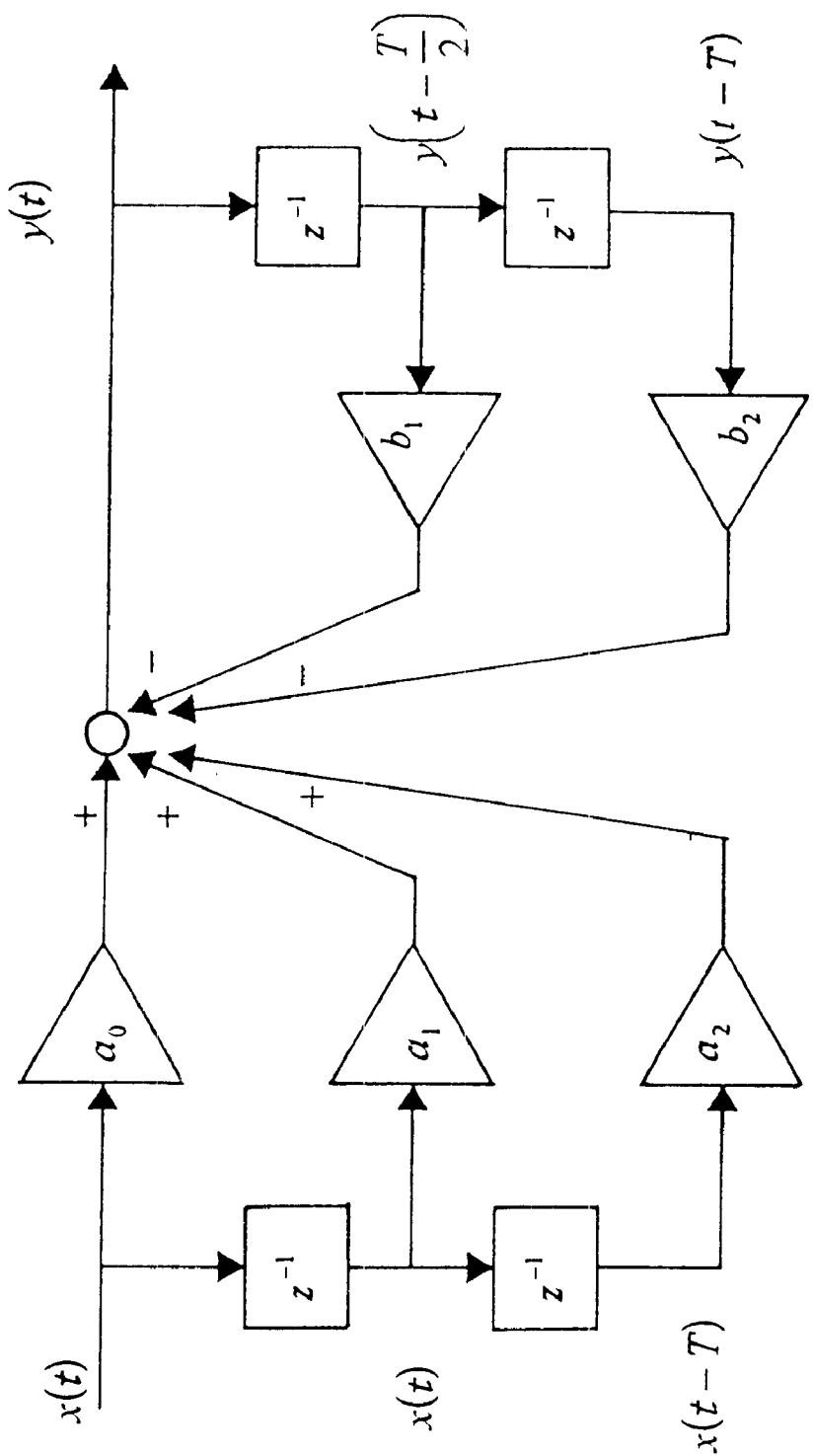
FIG. 15 is a circuit block diagram of a notch filter wherein signals of a notch operation (2) are added.

FIG. 15 is a circuit block diagram of a notch filter wherein signals of a notch operation (2) are added.

As time elapses by T/2 from the state of the signal shown in FIG. 14, the state is changed to a state of the signal shown in FIG. 15. That is, in this timing, an output y (t) of the notch filter is expressed by the following equation.

$$y(t)=a_0x(t)+a_1x(t)+a_2x(t-T)-b_1y(t-T/2)+b_2y(t-T)$$

As time further elapses by T/2, the state is changed to a state shown in FIG. 14, and as time furthermore elapses by T/2, the state is changed to a state shown in FIG. 15. These are alternatively repeated.

The output hold circuit 159 does not receive the output y (t−T/2) in the state shown in FIG. 14, but receives and holds the output y (t) in the state shown in FIG. 15. Thus, the output hold circuit 159 sequentially outputs the digital signals, which are subjected to a filtering processing by the notch filter 158, at a period T which is the same as the sampling time T.

FIGS. 16(A) and 16(B) are views showing frequency characteristics wherein two notch filters of 16 kHz and 22 kHz and a phase-lead compensation are disposed in a feedback system of a track servo, in a similar fashion to that of FIGS. 5(A) and 5(B) and FIGS. 6(A) and 6(B), and in addition a notch filter of 27.5 kHz having an structure shown in FIG. 11 is disposed in the feedback system. Incidentally, while FIG. 11 fails to show notch filters of 16 kHz and 22 kHz, those filters are disposed as a need arises.

In comparison of the point C in FIG. 16(A) with the point C in FIGS. 6(A), it would be understood that the arrangement according to the present embodiment causes the frequency identical with the Nyquist frequency to greatly attenuate.

Figure 17:
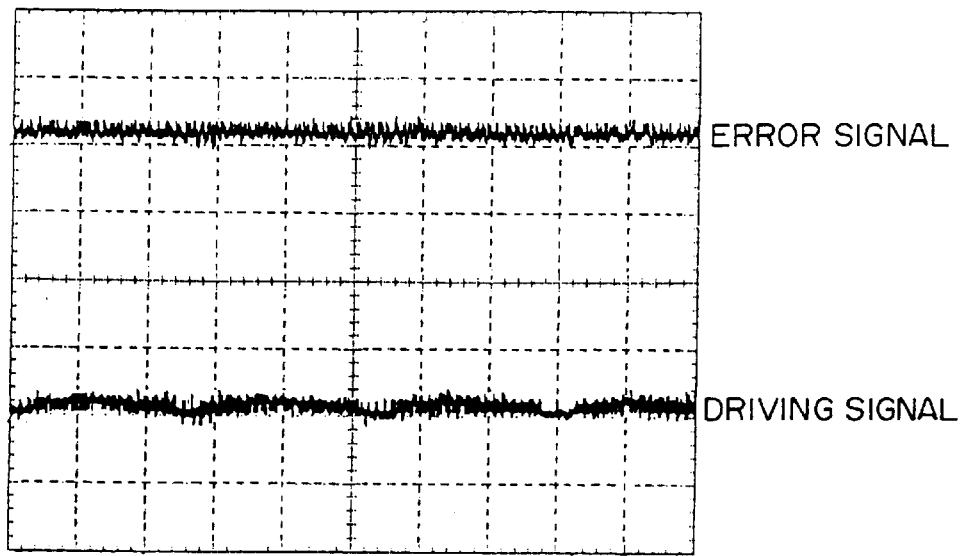
FIG. 17 is a view showing a signal wave form of an error signal when the noise of 27.5 kHz is added to the feedback control system having the frequency characteristics shown in FIGS. 16(A) and 16(B), and a driving signal.
Figure 18:
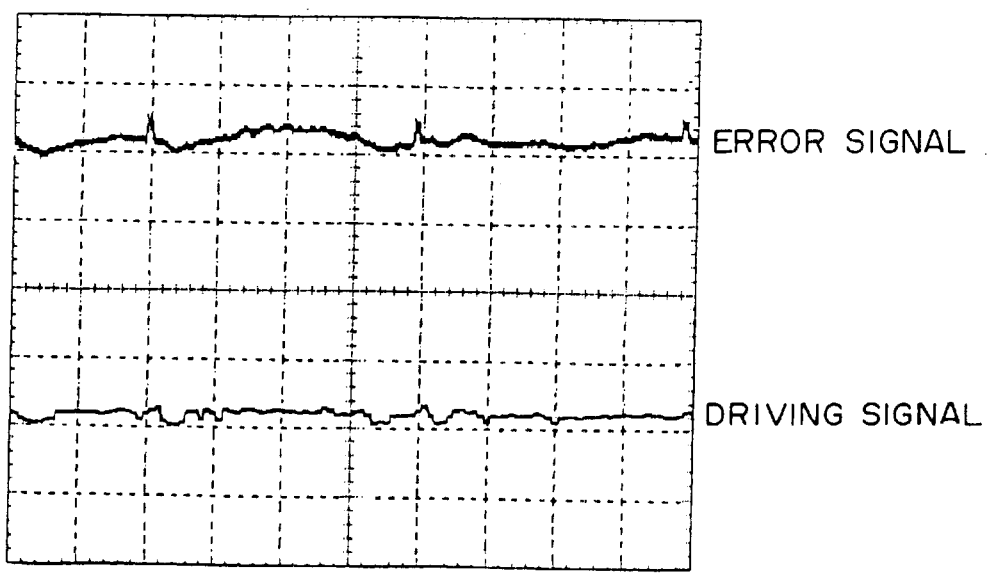
FIG. 18 is a view showing a signal wave form in which a part of the signals shown in FIG. 17 is enlarged on a time basis.

FIG. 17 is a view showing a signal wave form of an error signal (an output signal of the differential circuit 152) when the noise of 27.5 kHz is added to the feedback control system having the frequency characteristics shown in FIGS. 16(A) and 16(B), and a driving signal (an output signal of the driving circuit 156). FIG. 18 is a view showing a signal wave form in which a part of the signals shown in FIG. 17 is enlarged on a time basis.

Figure 7:
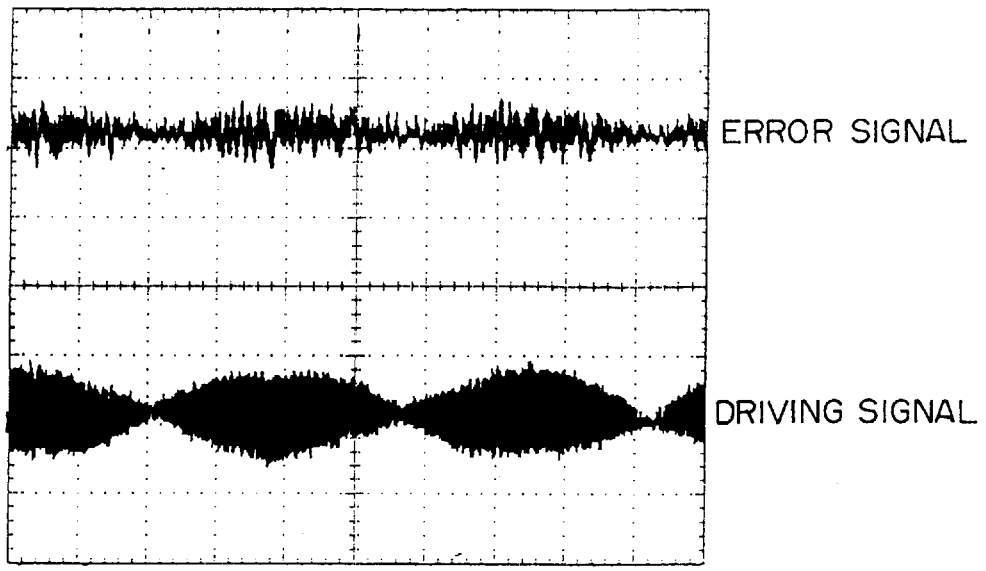
FIG. 7 is a view showing a signal wave form of an error signal outputted from the differential circuit when the noise of 27.5 kHz is added to the feedback control system, and a driving signal outputted from the driving circuit.
Figure 8:
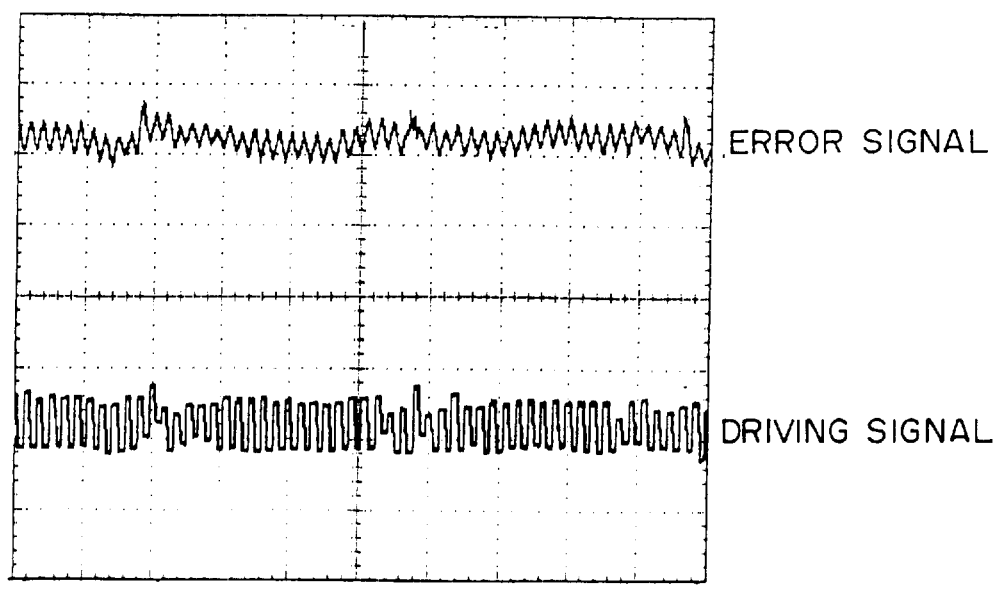
FIG. 8 is a view showing a signal wave form in which a part of the signals shown in FIG. 7 is enlarged on a time basis.
Figure 9A:
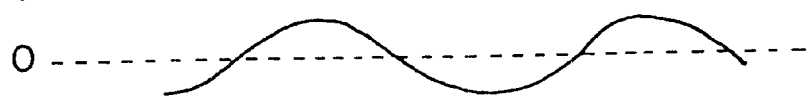
FIGS. 9(A)–9(C) are explanatory views useful for understanding another problem involved in the vibration of the driving signal.
Figure 9B:
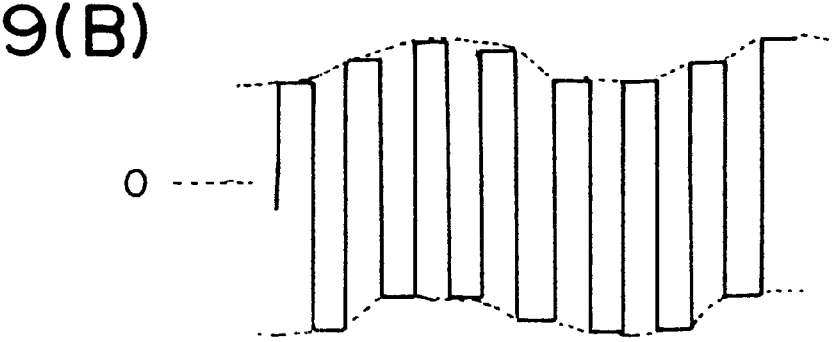
Figure 9C:
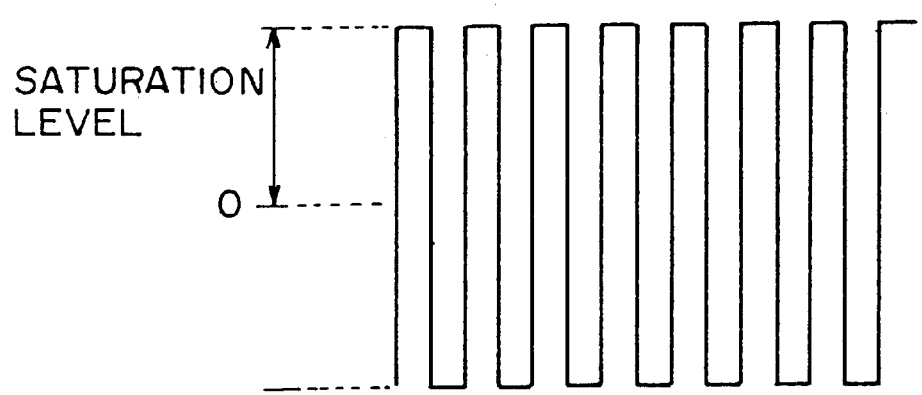

In comparison of FIGS. 17 and 18 with FIGS. 7 and 8, it would be understood that the control system is sufficiently stabilized as to the high frequency noises of noise of 27.5 kHz.

According to the present embodiment, the input hold circuit generates digital signals of a period T/2 to a sampling period T. However, it is not restricted to the period T/2. It is acceptable that the input hold circuit generates digital signals of 1/N (where N=integer) of the sampling period T (for example, T/3, T/4 etc.), or alternatively it is acceptable that the input hold circuit generates digital signals of an independent period, which is shorter than the sampling period T, but not 1/N (where N=integer) of the sampling period T. Even if the input hold circuit generates digital signals of any period, the output hold circuit restores the digital signals to digital signals of a period which is the same as the original sampling period T.

Figure 19:
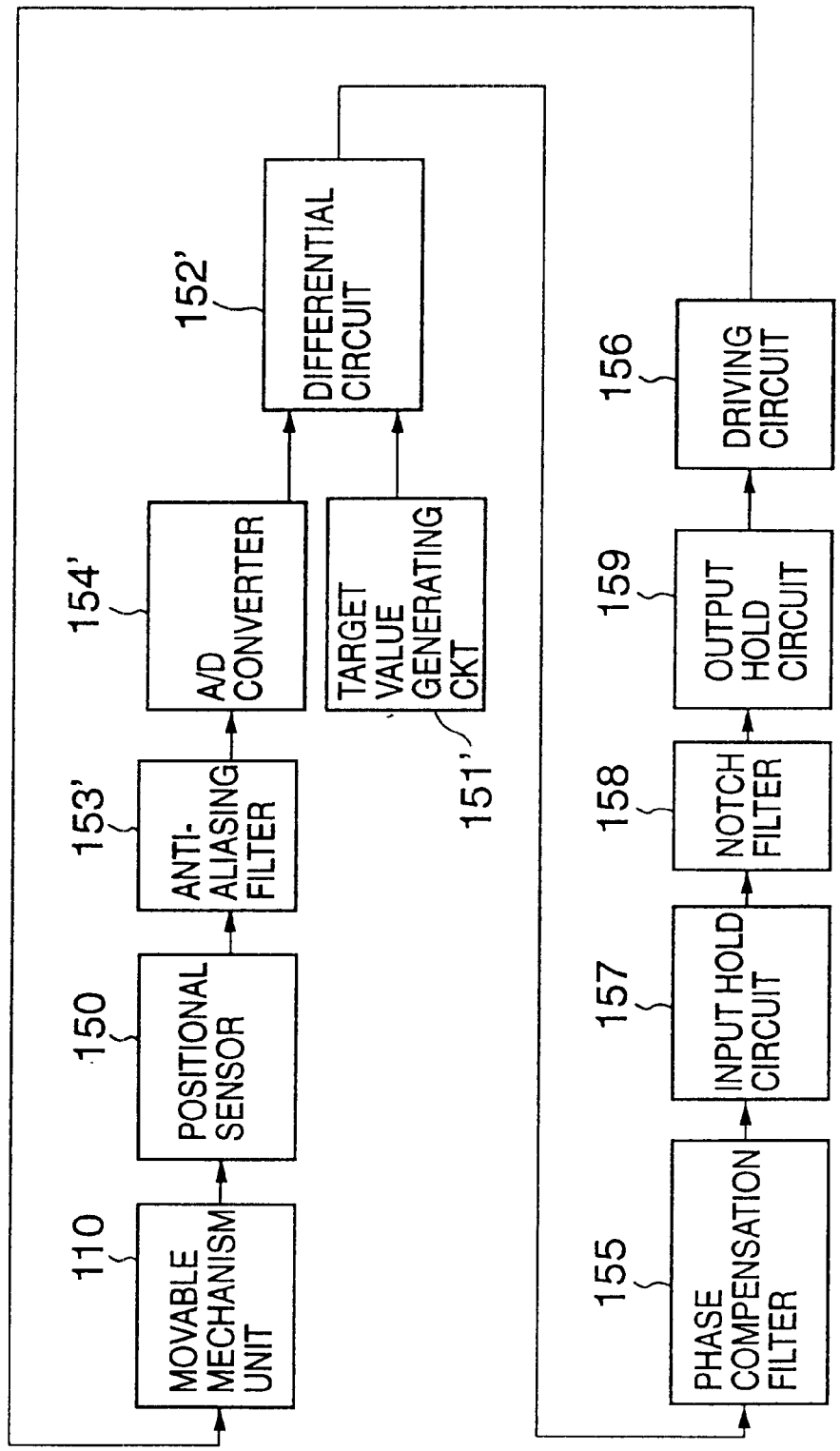
FIG. 19 is a block diagram of a feedback controller according to an alternative embodiment of the present invention.

FIG. 19 is a block diagram of a feedback controller according to an alternative embodiment of the present invention. In FIG. 19, the same parts are denoted by the same reference numbers as those of FIG. 11. And redundant description will be omitted.

The output of the positional sensor 150 is fed through an anti-aliasing filter 153' to an A/D converter 154' in which the output is converted into a digital signal. The digital signal thus obtained is fed to a differential circuit 152' in which a difference between the digital signal and a target value signal outputted from a target value generating circuit 151 is calculated.

The target value generating circuit 151' generates a digital signal representative of a target value signal. The differential circuit 152' performs an arithmetic operation of a difference between digital signals.

As described above, it is acceptable that the A/D converter performs the A/D conversion on the detection signal of the positional sensor 150, or alternatively it is acceptable that the A/D converter performs the A/D conversion on the error signal after processing of the detection signal, as shown in the embodiment of FIG. 11.

Figure 20:
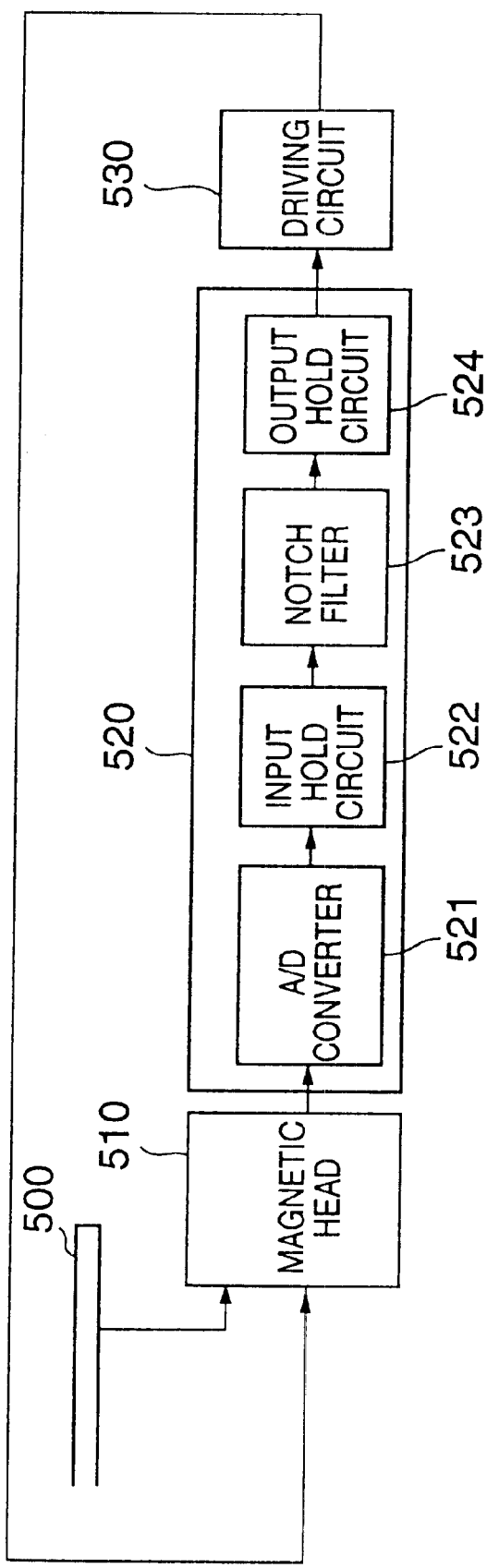
FIG. 20 is a block diagram of a feedback controller according to a further alternative embodiment of the present invention.

FIG. 20 is a block diagram of a feedback controller according to a further alternative embodiment of the present invention.

The feedback controller according to the present embodiment is applied to a magnetic storage device for picking up information stored in a magnetic disk 500.

The information stored in the magnetic disk 500 is read by a magnetic head 510. A position detection signal of the magnetic head 510 is fed to a DSP 520. An output of the DSP 520 is applied to a driving circuit 530. The magnetic head 510 is driven by an output of the driving circuit 530.

The DSP 520 comprises an A/D converter 521, an input hold circuit 522, a notch filter 523 and an output hold circuit 524. The input hold circuit 522, the notch filter 523 and the output hold circuit 524 are substantially the same as the input hold circuit 157, the notch filter 158 and the output hold circuit 159 shown in FIGS. 11 and 19 in their functions, respectively, while they have their inherent portions as to the control system for driving the magnetic head. It should be noticed that the those elements are incorporated in the DSP 520, and their functions are implemented in a combination of the hardware with the software.

Incidentally, according to the present embodiment, the notch filter is used as an example of the digital filter referred to in the present invention. However, the digital filter referred to in the present invention is not restricted to the notch filter, and a various types of digital filter can be adopted. It is acceptable to adopt any type of digital filter which makes it possible to deal with a frequency near the Nyquist frequency.

As mentioned above, according to a digital filter of the present invention, it is possible to have an effective filtering effect on a frequency band near the Nyquist frequency without increasing the sampling frequency, and thereby ensuring a sufficient stability in the even that the digital filter of the present invention is used for the feedback control.

In other words, the feedback controller according to the present invention is applicable to various types of driving units. And it is possible to improve a responsibility to the deviation from a target. For example, according to a storage device of the present invention to which a feedback controller of the present invention is applied, an application of the storage device to a track driving unit for moving a head in a track direction makes it possible to improve a track follow-up performance of the head. This feature may solve such a problem that when the head does not follow the track into an off-track, the head does not move promptly, and thug a control band is expanded so that a movement of the head is prompt. Further, an application of the storage device to a focus driving unit for moving the head in a focus direction makes it possible to improve the follow-up performance of the head in the focus direction, and whereby the head promptly responds to being out of focus.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A feedback controller wherein a driving state of a driving unit is detected to generate feedback signals so that a driving control for the driving unit is performed, said feedback controller comprising:

a sampling unit for sampling on a digital basis the feedback signals at a predetermined first period;

a filter input unit for sequentially holding the feedback signals sequentially transmitted from said sampling unit at the first period, and for sequentially outputting the transmitted feedback signals or held feedback signals at a second period which is shorter than the first period;

a digital filter for applying a filtering processing to the feedback signals outputted from said filter input unit; and a filter output unit for sequentially outputting the feedback signals subjected to the filtering processing by said digital filter, while thinning the frequency of the feedback signals at the first period.

2. A feedback controller according to claim 1, wherein said filter input unit sequentially outputs the transmitted feedback signals or the held feedback signals at the second period which is 1/N (where N=integer) of the first period.

3. A feedback controller according to claim 1, wherein said digital filter is a notch filter for eliminating or attenuating a specific frequency component.

4. A feedback controller according to claim 1, wherein said digital filter is a notch filter for eliminating or attenuating a frequency component which is the same as a Nyquist frequency.

5. A feedback controller according to claim 1, wherein said feedback controller controls a detection head for picking up information stored in an information recording medium in such a manner that said detection head comes close to the information recording medium and moves, and more particularly said feedback controller controls a movement of said detection head.

6. A digital filter device comprising:

a filter input unit for sequentially holding digital signals, which are sequentially transmitted at a predetermined first period, at the first period, and for sequentially outputting the transmitted digital signals or held digital signals at a second period which is shorter than the first period;

a digital filter for applying a filtering processing to the digital signals outputted from said filter input unit; and a filter output unit for sequentially outputting the digital signals subjected to the filtering processing by said digital filter, while thinning the frequency of the feedback signals at the first period.

7. A storage device having a head for at least reproducing information stored in an information storage medium, said storage device comprising:

a driving unit for moving and controlling said head;

a feedback signals generating unit for detecting a position of said head and generating feedback signals to be fed to said driving unit on a feedback basis;

a sampling unit for sampling on a digital basis the feedback signals at a predetermined first period;

a filter input unit for sequentially holding the feedback signals sequentially transmitted from said sampling unit at the first period, and for sequentially outputting the transmitted feedback signals or held feedback signals at a second period which is shorter than the first period;

a digital filter for applying a filtering processing to the feedback signals outputted from said filter input unit; and a filter output unit for sequentially outputting the feedback signals subjected to the filtering processing by said digital filter, while thinning the frequency of the feedback signals at the first period.

8. A storage device according to claim 7, wherein said driving unit is a track driving unit for moving said head in a track direction.

9. A storage device according to claim 7, wherein said driving unit is a focus driving unit for moving said head in a focus direction.

* * * * *